March 11, 1969   J. A. GULOTTA   3,432,285
METHOD AND APPARATUS FOR INITIALLY RESTRICTING
THE DIVERGENT FLOW OF FLOAT GLASS
Original Filed July 1, 1963   Sheet 3 of 3

INVENTOR.
JOSEPH A GULOTTA
BY
Chisholm and Spencer
ATTORNEY 3,432,285
METHOD AND APPARATUS FOR INITIALLY RESTRICTING THE DIVERGENT FLOW OF FLOAT GLASS
Joseph A. Gulotta, New Kensington, Pa., assignor to PPG Industries, Inc., a corporation of Pennsylvania
Continuation of application Ser. No. 291,816, July 1, 1963, which is a continuation-in-part of application Ser. No. 265,728, Mar. 18, 1963. This application Apr. 10, 1967, Ser. No. 629,707
U.S. Cl. 65—99    5 Claims
Int. Cl. C03b 18/00

ABSTRACT OF THE DISCLOSURE

Glass is continuously fed onto the surface of a molten bath which is heavier than the glass and the glass flows laterally and forms a layer on the bath which layer is moved along the bath. The lateral flow of the glass is restricted to produce a layer of gradually increasing width in the direction of its movement until it has reached a desired width. The restriction of lateral flow of the glass is released when the layer of glass is molten.

---

This application is a continuation of my copending application, Ser. No. 291,816, filed July 1, 1963, now abandoned which in turn is a continuation-in-part of my application, Ser. No. 265,728, filed Mar. 18, 1963, copending with Ser. No. 291,816 and now abandoned.

This application relates to the manufacture of flat glass by floating glass on a liquid bath, such as molten metal, so that the resultant flat glass has fire-finished surfaces requiring little or no additional surfacing for ultimate use.

It has been proposed heretofore to produce flat glass by floating a ribbon or sheet of glass upon the surface of a bath of molten metal.

When producing float glass of compositions approaching that of commercial plate and window glass or similar soda-lime glasses and using a molten metal such as a bath of tin or tin alloy, molten glass poured directly onto the bath of metal and freely floating thereon ultimately will attain equilibrium at a thickness called "equilibrium thickness." The exact thickness attained by the glass at equilibrium depends upon the composition of the glass and the metal bath. For soda-lime glass and a tin or predominantly tin bath, the equilibrium thickness of a freely floating layer of glass is about 0.27 inch. Even a preformed ribbon of glass of a thickness different from the equilibrium thickness when remelted while supported on the molten metal, will nevertheless seek the equilibrium thickness.

Ribbons or layers of glass thinner than the equilibrium thickness may be obtained by attenuating an equilibrium thickness ribbon, as by applying a downstream tractive force to an already stable portion of the continous ribbon. A ribbon of a thickness different from the described equilibrium thickness can also be produced by other methods, for example, as disclosed in the copending applications of Edmund R. Michalik, Ser. No. 188,664 now abandoned, filed Apr. 19, 1962, and U.S. Patent No. 3,241,939, issued Mar. 22, 1966 by selectively applying over the floating glass or a portion thereof a fluid pressure that is different from the fluid pressure applied to the surface of metal not covered by the glass and as disclosed in the copending application of William F. Galey, Ser. No. 251,541, filed Jan. 15, 1963, now abandoned, where the central portion of a layer of molten glass may be supported at a different level than the marginal edge portions thereof.

Conveniently, a continuous layer or ribbon of floating glass may be formed by depositing the molten layer of glass directly upon the molten bath of tin from a spout extending from the glass melting tank. As a relatively thick but narrow molten layer of glass is deposited upon the tin bath, the edges of the molten layer naturally spread on the bath, due to the high temperature of the glass and the bath, to form a buoyant body of molten glass of wider dimensions and of a stable thickness. Such an operation is disclosed and described in Union of South African patent application 60/3,067 and Republic of South African patent application 62/1,233.

Where a molten layer of glass is deposited directly upon the molten bath of metal and allowed to freely spread and achieve its equilibrium thickness, it has been found that a substantial length of the molten bath is utilized before the molten layer achieves its equilibrium thickness, and, of course, the precise width and location of the layer is indefinite. On the other hand, if a layer of glass deposited upon the molten bath is cooled to achieve dimensional stability while contacting confining walls of the tank, undesirable thickness variations in the layer of glass result from differential flow rates across the layer occasioned by contact of the viscous glass with the confining walls.

The present invention provides a method for depositing a molten layer of glass directly upon a molten metal bath while ovecoming the disadvantages of prior methods of forming a floating ribbon of desired dimensions. According to an effective method of practicing this invention, molten glass is deposited at a controlled rate directly upon the metal bath while the glass is essentially in a flowable state, i.e, in the temperature range of about 1700 to 2200 degrees Fahrenheit. The issued glass is confined upon the molten metal bath between inner surfaces of side walls inert to the glass, and the glass is withdrawn from between the confining side walls at a controlled rate to define the width and thickness of the layer while it is in contact with the walls. The layer is removed from contact with the side walls while the glass is still flowable, i.e., preferably at a temperature above about 1700 degrees Fahrenheit in the case of soda-lime glass and rarely below 1500 degrees Fahrenheit, so as to facilitate subsequent surfacing without the necessity of reheating the glass.

Most advantageously, the side walls at the surface of the metal bath which serve to confine the molten glass diverge in the direction of ribbon travel from the width of the deposited layer to the ultimately desired width of the ribbon. The refractory walls are constructed of a material readily wettable by molten glass, and the walls preferably include, at the terminal portions downstream from a glass depositing spout, a refractory portion nonwettable by molten glass. The rate of issuance of glass from the spout to the bath between the diverging walls and the angle at which the walls diverge, as well as the rate at which the glass is advanced along the metal bath and hence removed from between the diverging walls, are correlated to produce the desired ribbon.

Any attractive force between the wetted walls and the molten glass is relieved at the terminal ends of the diverging walls by the nonwetting refractory sections. Where the ribbon thickness at this location is at equilibrium thickness or greater, the glass may then be prevented from spreading laterally and thus held at the desired thickness and width attained at the terminal portions of the diverging walls.

Control of the thickness and width of the layer of molten glass at the location where it leaves the edge-contacting walls, or just prior to this location where the desired thickness is obtained, can be accomplished by applying a differential pressure over different portions of the glass layer or by providing a bi-level bath as already mentioned. In addition, the glass layer may be reduced to a thickness less than equilibrium by the application of a tractive force to a downstream stabilized portion of the layer or by a combination of such a tractive force and a differential pressure. It will be readily apparent that control of the layer thickness by the use of a pressure differential or bi-level molten metal bath affords a high degree of dimensional stability to the ribbon width, as well as to the ribbon thickness. It will also be readily apparent that the thickness may be modified in a desired manner by selecting the proper differential pressure, bi-level molten metal bath or tractive force to accomplish the desired change.

Several important advantages accrue from the practice of this invention. For example, because this process is capable of thinning and widening the molten glass directly deposited upon the tin bath to an extent significantly greater and in a shorter distance of glass travel along the bath than would be possible with a freely floating layer, a ribbon of greater width and diminished thickness may be obtained for any given quantity of glass flow from the tank and any given linear velocity of the formed ribbon. As a corollary of the above relationship, it will be understood that for a given linear ribbon speed and a finished ribbon thickness, the present invention will provide a wider ribbon and facilitate the manufacture of a larger quantity of glass in any given time.

An important advantage achieved with the present invention is the manner in which the precise location and width of the molten layer may be controlled, so as to facilitate subsequent operations such as the application of pressure through a pressure chamber above the glass. Due to the wide anchor provided for the floating layer of glass by the wetted walls, any tendency of the ribbon to move laterally of the bath is diminished.

In addition to the above advantages, by spreading the ribbon to the full width desired before releasing the ribbon from wetted contact with the diverging walls, marginal portions of the ribbon that are distorted during the release, but which are of a relatively constant width that is independent of total ribbon width, constitute a relatively small portion of the finished ribbon.

Other attendant advantages of this invention and the various embodiments thereof will be readily appreciated as the same become better understood by reference to the following detailed description when considered in connection with the accompanying drawings in which.

Figure 1:
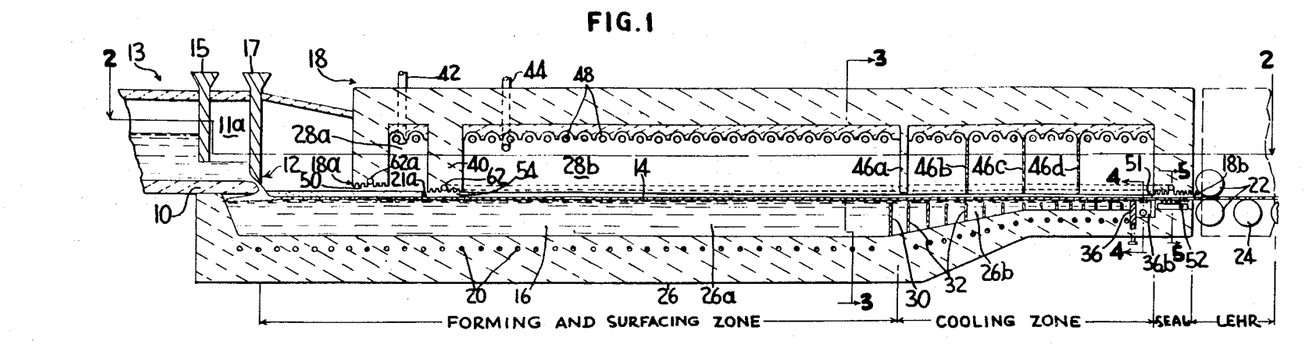
FIG. 1 is a longitudinal section of an apparatus for producing glass according to the inventive process herein contemplated showing means for depositing a layer of glass upon a molten bath and controlling its width, thickness and position upon the bath and showing means for selectively applying a differential pressure to the top of a ribbon of glass supported on a molten metal bath.
Figure 2:
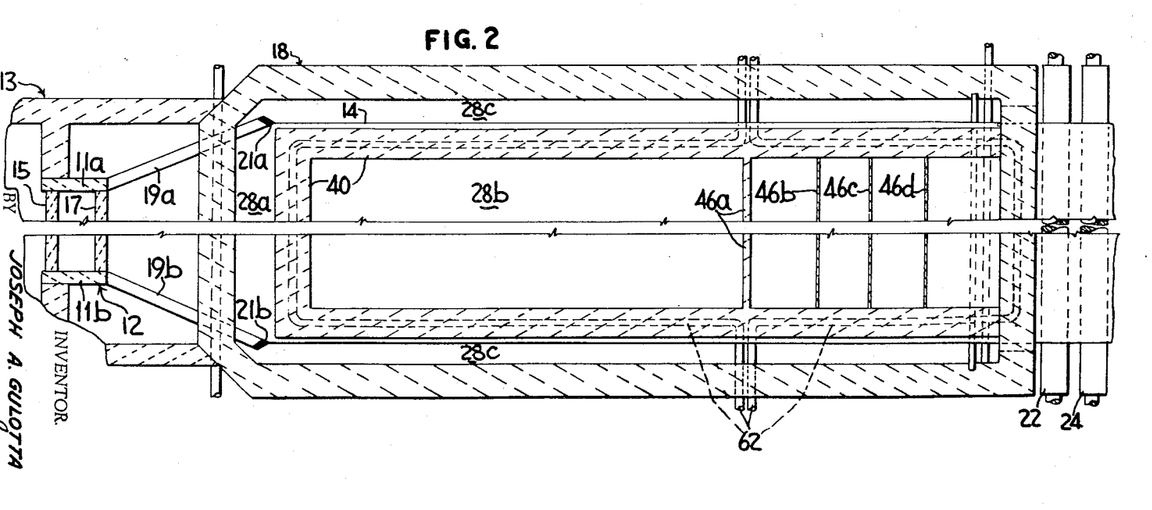
FIG. 2 is a horizontal sectional view taken on line 2—2 of FIG. 1 looking in the direction of the arrows.

With particular reference to the drawings, in FIGS. 1 and 2 there is shown a floor or lip 10 which, with side jambs 11a and 11b, forms a spout 12 of generally rectangular cross section at the delivery end of a glass melting furnace 13. Glass issuing from spout 12 forms a layer of molten glass 14 upon the surface of a bath of molten metal 16 contained within a tank 18. The metal may be tin, an alloy of tin, or the like. A glass flow regulating tweel 15 and gate 17, each adjustably suspended in a known manner, cooperate with the spout 12 and control the flow of glass from the furnace 13 to the molten metal bath 16.

Refractory side walls 19a and 19b are located just beneath spout 12 and extend from the spout 12 along, in contact with, and above the surface of the metal bath 16. Preferably, they also extend below the surface of the metal bath. They are suitably supported in position, as from the walls of tank 18 and by hangers, not shown, or they may be otherwise anchored to the tank structure. Side walls 19a and 19b diverge in the direction of glass travel, i.e., from the spout toward the far end of tank 18, from a width approximately equal to the space between side jambs 11a and 11b to a width corresponding to the desired ribbon width. Preferably, the side walls 19a and 19b are constructed of conventional refractory material, such as fired clay block, normally used for glass tank construction and are wettable by molten glass. At the downstream terminal end of each side wall 19a and 19b is a refractory insert 21a and 21b, respectively, of a material such as graphite that is nonwettable by molten glass and which facilitates freeing the molten layer of floating glass 14 from contact with side walls 19a and 19b.

In order to maintain the metal of the bath 16 in molten condition, thermal regulating means, such as electrodes 20 may be located in the floor of the tank 18, as illustrated, or may be submerged within the molten metal, so as to affect the temperature of the bath. The electrodes 20 are connected to a suitable source of power (not shown) in a conventional manner. Each electrode may be individually energized and controlled, so as to provide a desired thermal gradient within the various sections of the tank 18, as will be described. The glass ribbon 14, after treatment within the tank 18, is withdrawn from the tank without injury to its surface by traction or pinch rolls 22 onto a roller conveyor 24.

Figure 3:
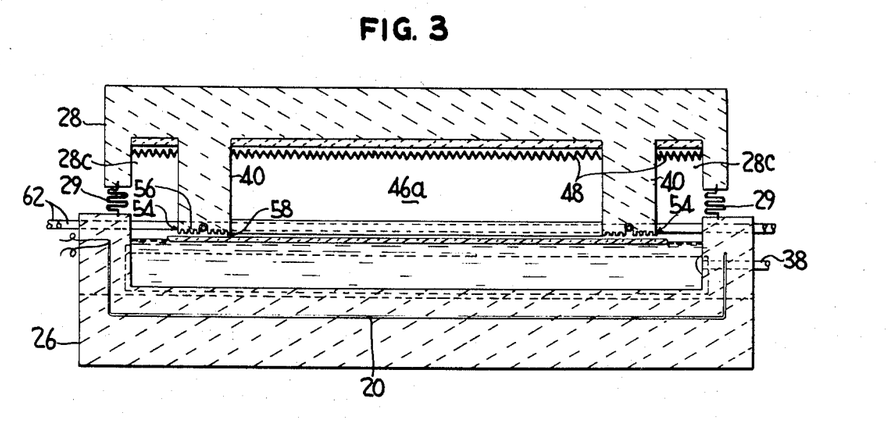
FIG. 3 is a sectional view taken on the line 3—3 of FIG. 1 and in the direction of the arrows showing the forming and surfacing zone and tank wall construction.

The tank 18 is constructed of a refractory bottom portion 26 and a refractory top portion 28, joined and sealed together, except for an entrance 18a and an exit 18b by a suitable sealing means (FIG. 3). The sealing means illustrated is of a bellows type and permits the top portion 28 of the tank to be raised from the bottom portion 26 for repairs, etc., without the necessity of removing refractory parts and the subsequent repair of removed parts. The bottom portion 26 contains the molten metal 16 and is subdivided into a forming and surfacing zone 26a and a cooling zone 26b. These zones are separated by a submerged baffle 30 to materially reduce convection currents in the molten metal. Other submerged baffles 32 are in the cooling zone to control convection currents in that zone. The level of the metal of the bath is controlled by a level control weir 36 at the exit end of the tank and by an inlet 38. Preferably, the metal level is always maintained so that the glass ribbon being treated remains free of contact with any submerged wall or baffle within the tank 18. The inlet 38 (see FIG. 3) is located through a wall of the tank 18 and is connected to a suitable source of molten metal to supply molten metal to the tank 18. The level control arrangement of weir 36 and other details of such control will be later described.

The space within the side and end walls of tank 18 between the top portion 28 and the surface of the metal pool is divided into two chambers 28a and 28b by the front side of a circumferential wall 40. This wall depends from the roof 28 and has its side sections spaced from the walls of tank 18, thereby providing a gas space 28c along each side of the tank. Spaces 28c may, in effect, be continuations or extensions of chamber 28a.

A gas which is inert to the components of the bath, such as nitrogen or the like, is introduced, under pressure, into each gas chamber or pressure zone, through conduits 42 and 44, each connected to a suitable source of the pressurized gas (not shown). The gas is preferably heated so as to eliminate chilling of the zones and the glass being treated. The pressure at which the gas is introduced into the zones 28a and 28c may be different from the pressure of the gas introduced into the zone 28b so as to control the thickness of the floating layer of glass, as will be later described. The pressure zone 28b may be further subdivided by walls or baffles 46a, 46b, 46c and 46d for temperature control purposes.

Radiant heaters 48 are located adjacent the roof of the tank 18 to maintain the desired glass temperature between the exit and entrance ends of the tank. These radiant heaters 48, located in both pressure zones, as illustrated, are connected in a conventional manner to a source of electric power (not shown) and may be individually controlled for temperature gradient control. The control means is any conventional control means and need not be described and shown in detail. If necessary, cooling means can be located above the cooling zone to insure the proper temperature of the glass being removed from the bath.

Pressure within the zones of the tank above the molten metal is maintained, and the leakage of inert gas from the zones is maintained by the use of fluid pressure seals 50 at the entrance end of the tank, 51 at the exit end of the tank, and by seal 54 associated with the wall 40. The seals 51 and 54 include a plurality of grooves 56 separated by lands 58 (see FIG. 3) suitably supplied with a curtain of inert gas under pressure, as by apertured pipe 62. The upper seal of the entrance seal arrangement 51 is similarly constructed, and inert gas under pressure is supplied through pipe 62a.

Figure 5:
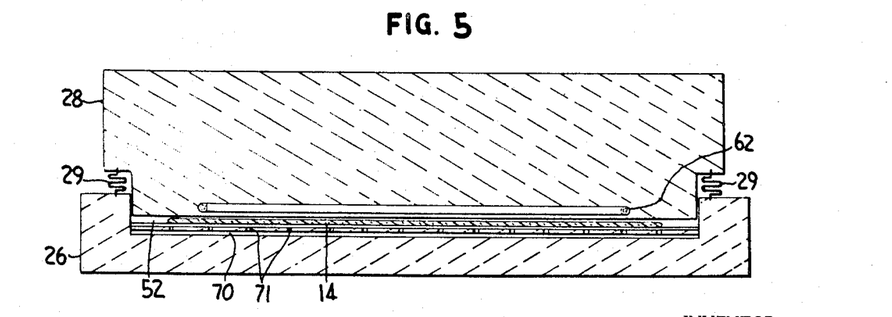
FIG. 5 is a sectional view taken on line 5—5 of FIG. 1 looking in the direction of the arrows showing the exit seal of the molten metal tank.

A lower seal 52 at the exit end of the tank 18 is constructed to provide a gaseous support for the glass to prevent damage thereto from contact with tank. As shown in FIGS. 1 and 5, a plenum chamber 70, connected to a suitable source of inert gas under pressure, supplies gas through orifices 71 to a plurality of grooves separated by lands of a similar construction to the upper seal.

Figure 4:
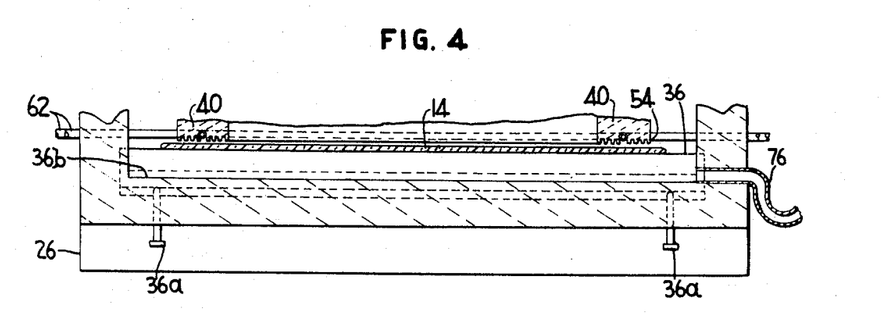
FIG. 4 is a sectional view taken on line 4—4 of FIG. 1 and in the direction of the arrows showing a molten metal level control structure at the exit end of the molten metal tank.

The level control means for controlling the level of the molten metal in the bath 16 includes the weir 36 and the inlet 38. The weir 36 is a plate of a refractory material slideable within slots formed in the tank refractory part. The weir is vertically adjustable by suitable means, such as screws 36a (FIG. 4), so as to adjust the molten metal level, depending upon the thickness of the glass being produced. The weir defines one side of a trough 36b (FIGS. 1 and 4), the other side and bottom of the trough being defined by walls of the tank 18 or other suitable refractory material. Conduit 76 passes through the wall of the tank 18 and communicates at one end with the trough 36b. The conduit is connected to discharge molten metal into a sump (not shown) for regeneration and reheating and from which molten metal is pumped to the tank 18 through the inlet 38. The conduit 76 is provided with a trap, i.e., a U-bend in the conduit, so as to prevent the entrance of atmospheric air into the tank 18 which would cause oxidation of the metal of the bath.

OPERATION

In the operation of this device, molten glass from tank 13 is deposited from spout 12 onto the metal bath 16 between and in contact with diverging walls 19a and 19b. The layer deposited is narrower and thicker than the ultimately desired ribbon. The layer of molten glass spreads across the metal bath between the walls 19a and 19b as the layer advances along the bath from the spout toward the exit end of tank 18.

By virtue of a controlled rate of feed of molten glass from the spout, a controlled rate of advance of the molten layer along the metal bath, the rate at which the side walls 19a and 19b diverge and due to the contact between the glass and the walls, the molten layer of glass reaches a predetermined width and thickness at the terminal ends of walls 19a and 19b. The width is controlled by the diverging walls and, therefore, at a constant throughput of glass, the thickness may be established and controlled by controlling the velocity of the ribbon at the point at which it is released from the walls. Control of this velocity, normally afforded by traction rolls acting upon a stabilized portion of the ribbon downstream of the metal bath, may be facilitated by the use of driven edge knurls (not shown) in contact with the edges of the floating layer of glass intermediate the terminal portions of the diverging side walls and the exit end of the molten metal bath.

At a location intermediate the length of side walls 19a and 19b, the layer of glass 14 passes through the seal 50 at the entrance 18a to the front section 28a of the tank 18. Gas, which is inert to the metal, is fed into pipe 62a and flows downwardly impinging against the glass and thereby isolates the interior of tank 18 from the enclosed area adjacent spout 12. A similar gas is supplied to the plenum chamber 70 under pressure high enough to cause the gas in this chamber to flow through the orifices into the grooves of lower seal 52 and to hold the ribbon away from the solid parts of the tank at the exit end 18b.

In general, this gas is preheated (by means not shown) to a temperature sufficiently high to prevent undue cooling of the glass. Normally, the temperature of the gas supplied to pipe 62a will be above 1000 degrees Fahrenheit and preferably in the range of 1600 degrees to 2000 degrees Fahrenheit. The temperature of the gas supplied to chamber 70 will normally be above 500 degrees Fahrenheit.

Within chamber 28a the glass leaves side walls 19a and 19b at a predetermined width and thickness. The graphite inserts 21a and 21b facilitate the release of molten layer 14 from walls 19a and 19b at the precise location and ribbon width desired. This is further facilitated by the acute angle and sharp intersection formed at the juncture of the inside surfaces of walls 19a and 19b and the end surfaces thereof at the downstream terminal portions of the walls.

As the molten layer of glass leaves side walls 19a and 19b at its predetermined thickness and width, it passes from chamber 28a through the seal 54 beneath circumferential wall 40 into the chamber 28b. As shown in the drawings, the ribbon 14 has a width greater than that enclosed by the wall 40, thus providing a narrow margin which extends beyond the edges of the wall 40 into the chambers 28c.

Sealing gas is delivered to the pipes 62 disposed in the wall 40 and is caused to impinge against the edge portions of the ribbon 14 which is immediately below the walls 40, thereby separating the chamber 28b from 28c by a gaseous curtain. This gas is supplied at a pressure equal to or greater than the pressure established on each side of the curtain. The temperature of the gas supplied to the front section and side sections of these walls in front of baffle 46a generally should approximate a melting temperature of the glass or at least should be high enough so as to avoid cooling the ribbon edges below a melting temperature.

The ribbon 14, while floating on the metal surface, advances through the chamber 28b and finally is withdrawn from the tank 18 passing through the seal 51. It is pulled from the tank between the traction rolls 22 which may, if desired or if necessary, exact enough tension upon the ribbon to keep it moving.

As the ribbon 14 passes through the chamber 28b, the temperature is maintained high enough to facilitate viscous flow of the glass within the forming and surfacing zone of the tank. During this time, the surfaces of the ribbon smooth out and the ribbon seeks an equilibrium thickness, the magnitude of which is dependent upon the pressure differential between chamber 28b and chambers 28c.

Pressure chamber 28b may be used to either maintain the thickness of the molten layer of glass as it issues from between side walls 19a and 19b or it may be used to further modify the thickness of the molten layer, particularly to further decrease the layer thickness. The pressure required in the chamber 28b depends upon the thickness desired and the external pressure, i.e., the pressure in the chambers 28c into which the edges of the ribbon or layer extend. Where it is desired to produce a ribbon thinner than the aforesaid equilibrium thickness of about 0.27 inch, the pressure in the chamber 28b should be at least 0.01 ounce per square inch above the pressure at the edges of the molten ribbon, i.e., in the chambers 28c.

For example, the ribbon tends to stabilize at a thickness of $3/16$ inch when the pressure differential is 0.11 ounce per square inch.

The degree of stabilization is a function of time and temperature. Consequently, it is readily possible to diminish the thickness of the layer of glass leaving side walls 19a and 19b from, for example, an equilibrium thickness of approximately 0.27 inch to a thickness of approximately 1/8 inch by applying a suitable pressure differential of approximately 0.2 ounce per square inch between chamber 28b and chambers 28c and by providing sufficient time during which the ribbon passes through the forming and surfacing zone for the ribbon to attain the thinner dimension.

In general, the pressure differential established between the chamber 28b and that at the edge of the sheet or ribbon ranges from 0.01 to 2 ounces per square inch. Higher differential pressures normally are unnecessary and may be difficult to maintain. They should in no event be so high as to cause the ribbon to break and rarely are above 5 to 10 ounces per square inch.

It will be understood that where the thickness of the ribbon as it leaves side walls 19a and 19b is greater than the equilibrium thickness of the glass, this greater thickness may be maintained by varying the pressure differential between chamber 28b and chambers 28c so that the pressure in chamber 28b is less than the pressure in chambers 28c.

The temperature established in the fore part of the chamber 28b is a melting temperature of the glass of the ribbon. Toward the end, i.e., beyond baffle 46a, the temperature is reduced low enough to ensure delivery of a stable ribbon which is not marred by contact with rolls to the discharge end of the tank, for example 600 to 1000 degrees Fahrenheit or below.

It will be understood that the gas discharge through pipes 62 along walls 40 is supplied at a pressure or at a velocity sufficient to maintain the pressure differential between chambers 28b and 28c. As previously explained, the gas, which is discharged in this way beside areas where the ribbon is held at a melting temperature, is heated to a temperature substantially that of the glass. On the other hand, at the farther ends of the chamber, e.g., beyond baffle 46a, the ribbon is cooled and gas supplied to pipes 62 along these portions of walls 40 normally is substantially cooler, rarely above the temperature of the portion of ribbon opposite such wall portions and may advantageously be much lower in temperature.

Example I

Molten glass of a temperature of approximately 2100 degrees Fahrenheit is issued at a constant rate from a spout 12 inches wide directly upon a molten metal bath of 100 percent tin having a weight density of 6.52 grams per cubic centimeter at 1800 degrees Fahrenheit. The glass has a composition by weight of 71.38 percent $SiO_2$, 13.26 percent $Na_2O+K_2O$, 11.76 percent CaO, 2.54 percent MgO, 0.75 percent $Na_2O_4$, 0.15 percent $Al_2O_3$, 0.11 percent $Fe_2O_3$ and 0.06 percent NaCl and a weight density of 2.542 grams per cubic centimeter.

The tank of molten metal is of the construction illustrated in FIGS. 1 to 5 of the drawings and is longitudinally divided into a forming and surfacing zone, and a cooling zone. The metal in the forming and surfacing zone is maintained at a temperature of 1900 degrees Fahrenheit. In the cooling zone, the metal temperature ranges from 1900 degrees Fahrenheit to 1000 degrees Fahrenheit in the direction of glass travel. The space above the metal beneath top 28 of tank 18 is subdivided into two pressure chambers and pressurized gas is fed to each chamber. The gas is preheated to 1900 degrees Fahrenheit for this supply. The first chamber 28a (and also chambers 28c) is maintained at slightly above atmospheric pressure, i.e., 0.3 ounce per square inch gauge, while the second chamber 28b is maintained at 0.5 ounce per square inch gauge pressure, so that a pressure differential of 0.2 ounce per square inch exists between the two chambers.

Refractory side walls 19a and 19b, wettable by molten glass, are in contact with the surface of the metal bath and diverge from a spacing of one foot between the inside or facing surfaces to a maximum spacing of three feet at their downstream terminal ends and extend along the bath in the direction of glass travel a distance of approximately 8 feet. Each side wall includes a two-inch length of graphite at the downstream terminal end.

The layer of glass on the surface of the tin bath 16 between diverging walls 19a and 19b and in wetting contact with the walls attains equilibrium thickness across its width at a position adjacent the graphite inserts 21a and 21b at the ends of side walls 19a and 19b. The glass at this point is at a temperature of about 1800 degrees Fahrenheit.

The ribbon or layer then passes beneath the second chamber 28b. The width of the layer is greater than the width of the second chamber 28b so that the margins of the layer extend laterally beyond the outer side edges of the chamber. By virtue of the pressure differential between chamber 28b and chambers 28a and 28c, the central portion of the ribbon beneath chamber 28b becomes thinner through viscous flow of the glass and attains a gross thickness of 1/8 inch. The speed at which the ribbon travels is increased to maintain a constant ribbon width.

Alternatively, the ribbon may be permitted to grow laterally.

Radiant heat is added from above the ribbon or layer of glass by heating elements 48 to help maintain the glass at a melting temperature throughout its entire thickness in a section across the entire width of the ribbon under chamber 28b. The ribbon is then cooled at the exit end of the molten metal tank to a temperature of approximately 1000 degrees Fahrenheit, after which it is withdrawn from metal contact. The ribbon thickness is substantially ⅛ inch and the surfaces are fire-finished and flat, except for the edges, which are bulbed. The ribbon is withdrawn at a speed of approximately 48 inches per minute.

The interior and exterior of the second chamber are separated by a gas curtain, as illustrated in the drawing, wherein the gas is delivered at a pressure of 0.5 ounce per square inch.

Example II

The procedure of Example I is followed except that the first chamber and second chamber are maintained at the same pressure, and the layer or ribbon of glass maintains the gross thickness of approximately ¼ inch (i.e., equilibrium) that it attained at a position adjacent the graphite inserts 21a and 21b at the ends of side walls 19a and 19b. The ribbon is withdrawn from metal contact at a thickness of approximately ¼ inch at a speed of approximately 24 inches per minute.

Example III

Molten glass of a temperature of approximately 2100 degrees Fahrenheit is issued at a constant rate from a spout 12 inches wide directly upon a molten metal bath of 100 percent tin having a weight density of 6.52 grams per cubic centimeter at 1800 degrees Fahrenheit. The glass has a composition, by weight, of 71.38 percent $SiO_2$, 13.26 percent $Na_2O+K_2O$, 11.76 percent CaO, 2.54 percent MgO, 0.75 percent $Na_2SO_4$, 0.15 percent $Al_2O_3$, 0.11 percent $Fe_2O_3$ and 0.06 percent NaCl and a weight density of 2.542 grams per cubic centimeter.

The tank of molten metal is of the construction illustrated in FIGS. 1 to 5 of the drawings and is longitudinally divided into a forming a surfacing zone and a cooling zone. The metal in the forming and surfacing zone is maintained at a temperature of 1900 degrees Fahrenheit. In the cooling zone, the metal temperature ranges from 1900 degrees Fahrenheit to 1000 degrees Fahrenheit in the direction of glass travel. The space above the metal beneath top 28 of tank 18 is subdivided into two pressure chambers and pressurized gas is fed to each chamber. The gas is preheated to 1900 degrees Fahrenheit for this supply. The second chamber 28b is maintained at slightly above atmospheric pressure, i.e., 0.3 ounce per square inch gauge while the first chamber 28b (and also chambers 28c) is maintained at 0.63 ounce per square inch gauge pressure, so that a pressure differential of 0.33 ounce per square inch exists between the two chambers.

Refractory side walls 19a and 19b, wettable by molten glass, are in contact with the surface of the metal bath and diverge from a spacing between the inside or facing surfaces of one foot to an ultimate spacing of three feet and extend along the bath in the direction of glass travel a distance of approximately 8 feet. The downstream terminal ends of the side walls include a two-inch length of graphite.

The layer of glass on the surface of the tin bath 16 and between diverging walls 19a and 19b and in wetting contact with the walls attains a gross thickness of approximately ½ inch across its width at a position adjacent the graphite inserts 21a and 21b at the ends of side walls 19a and 19b. The glass at this point is at a temperature of about 1800 degrees Fahrenheit.

The ribbon or layer then passes beneath chamber 28b. The width of the layer is greater than the width of the second chamber 28b so that the margins of the layer extend laterally beyond the outer side edges of the chamber. By virtue of the pressure differential between chambers 28b and chambers 28c, the central portion of the ribbon beneath chamber 28b is maintained at a thickness of ½ inch.

Radiant heat is added from above the ribbon or layer of glass by heating elements 48 to help maintain the glass at a melting temperature throughout its entire thickness in a section across the entire width of the ribbon under chamber 28b. The ribbon is then cooled at the exit end of the molten metal tank to a temperature of approximately 1000 degrees Fahrenheit, after which it is withdrawn from metal contact. The ribbon thickness remains at substantially ½ inch and the surfaces are fire-finished and flat, except for the edges which are thinner. The ribbon is withdrawn at a speed of approximately 12 inches per minute.

The interior and exterior of the second chamber are separated by a gas curtain, as illustrated in the drawing, wherein the gas is delivered at a pressure of 0.62 ounce per square inch.

OTHER EMBODIMENTS

Figures 6, 8:
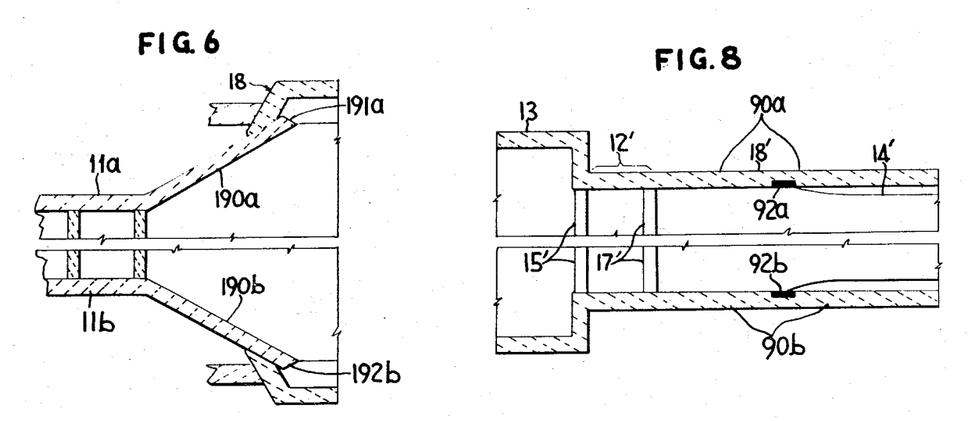
FIG. 6 is a partial, horizontal sectional view of another embodiment of apparatus for producing glass according to the inventive process herein contemplated showing means for controlling the width, thickness and location of a molten layer of glass deposited upon a molten metal bath.
FIG. 8 is a partial, horizontal sectional view of a further embodiment of apparatus for producing glass according to the inventive process herein contemplated.
Figure 7:
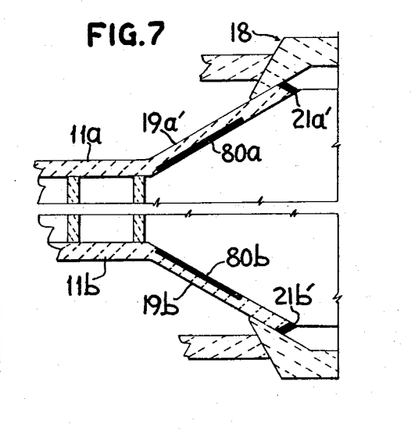
FIG. 7 is a partial, horizontal sectional view similar to FIG. 6, but showing a further modification of the means for controlling the width, thickness and location of the molten layer of glass.

Variations in the construction of diverging side walls 19a and 19b are shown in FIGS. 6 and 7. The diverging side walls 190a and 190b of FIG. 6 are constructed entirely of a refractory that is wettable by molten glass. Except for the absence of the graphite inserts 21a and 21b associated with side walls 19a and 19b, the side walls of the embodiment of FIG. 6 function in the same manner as already described. In this embodiment, control of the point at which the marginal edges of the glass layer separate from the diverging side walls is controlled solely by the acute angle and sharp juncture between the inner facing surfaces of side walls 190a and 190b and their respective end surfaces or faces 191a and 191b.

In the embodiment disclosed in FIG. 7, diverging side walls 19a' and 19b' are constructed in the same manner as side walls 19a and 19b of FIGS. 1 and 2 but each includes a graphite insert 80a and 80b on the inner vertical faces. These inserts extend from the spout toward the terminal ends of the side walls but terminate short of the ends.

Figure 9:
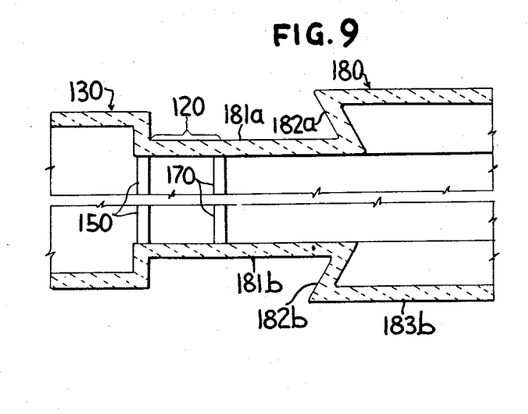
FIG. 9 is a partial, horizontal sectional view of a still further embodiment of apparatus for producing glass according to the inventive process herein contemplated.

There is shown in FIGS. 8 and 9, embodiments which utilize the principle of the present invention in a slightly different manner from the previously described embodiments. In the embodiment of FIG. 8, there is shown a glass melting tank 13' having a spout 12', tweel 15' and gate 17' of similar construction to that already described in connection with FIGS. 1 and 2 but of a width equal to the width of the tank 18' containing the molten metal bath. Side walls 90a and 90b of tank 18' are constructed of a conventional refractory material wettable to molten glass. Graphite inserts 92a and 92b are positioned in side walls 90a and 90b, respectively, adjacent the surface of the metal bath and extend in the direction of glass movement a distance of several inches. The molten glass deposited upon the metal bath from spout 12' covers the metal across the entire width of tank 18' and is confined by the refractory walls 90a and 90b along marginal edges upstream from graphite inserts 92a and 92b. Of course, the layer of glass need not be initially deposited across the entire width of the tank. A tractive force is exerted upon the ribbon or molten layer 14' at the discharge end of tank 18' which tends to advance the ribbon at a slightly greater rate at the discharge end than at the spout 12'. Thus, the downstream tractive force reduces the thickness of the molten, i.e., flowable, layer to a predetermined thickness which, if desired, may be less than the equilibrium thickness. Any attractive force between the tank walls and the marginal edges of the molten layer is relieved by nonwettable graphite inserts 92a and 92b so that the remainder of the ribbon is freely floating upon the metal bath. By applying a proper tractive force on a stable portion of the ribbon, the thickness to which the ribbon is reduced at the point of its release from contact with walls 90a and 90b may be maintained as long as such thickness is equilibrium thickness or less. Alternatively, a pressure chamber may be utilized in the same manner as described in connection with the embodiments of FIGS. 1 to 5.

The embodiment shown in FIG. 9 of the drawings, functions in essentially the same manner as the embodiment just described in connection with FIG. 8 but utilizes a variation in tank dimensions in lieu of graphite inserts 92a and 92b to control the ribbon thickness. Molten glass issues from a spout 120 of a tank 130 onto a molten metal bath contained in tank 180. Tweel 150 and gate 170 control the flow. Walls 181a and 181b of tank 180 are of the same width as spout 120 and constructed of a refractory material wettable by molten glass. These walls terminate at walls 182a and 182b which extend outwardly from side walls 181a and 181b at an acute angle therewith. Side walls 183a and 183b extend from walls 182a and 182b essentially parallel to walls 181a and 181b so as to form a wider section of tank 180 downstream in the direction of glass travel from spout 120 and side walls 181a and 181b. The acute angle at which walls 182a and 182b extend from walls 181a and 181b, respectively, prevent the ribbon from adhering to the side walls beyond the desired point. As an alternative to the acute angle, or in addition, graphite inserts may be positioned at the ends of walls 181a and 181b to assure proper release of the molten glass from wetted contact with walls 181a and 181b. By controlling the rate at which molten glass is deposited from spout 120 upon the molten bath and the rate at which the formed ribbon is withdrawn from the exit end of the tank, the ribbon thickness may be brought to equilibrium thickness or less at the point of departure from walls 181a and 181b. As a result, even though the ribbon is in a flowable state (i.e., still at a temperature at or above 1700 degrees Fahrenheit), there will be no appreciable widthwise spreading of the freely floating portion of the ribbon.

Figure 10:
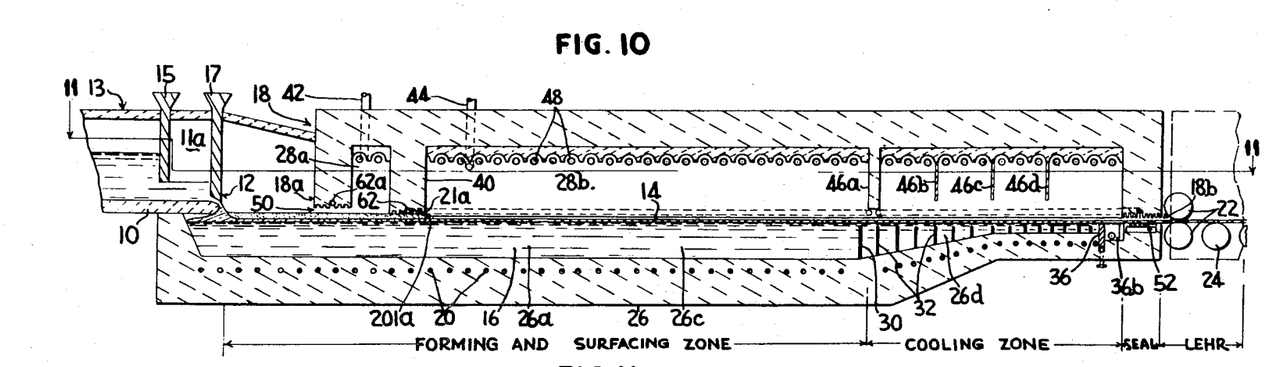
FIG. 10 is a longitudinal section of another embodiment of apparatus for producing glass according to the inventive process herein contemplated, similar to that shown in FIG. 1, but showing a further modification of the means for controlling the width, thickness and location of the molten layer of glass.
Figure 11:
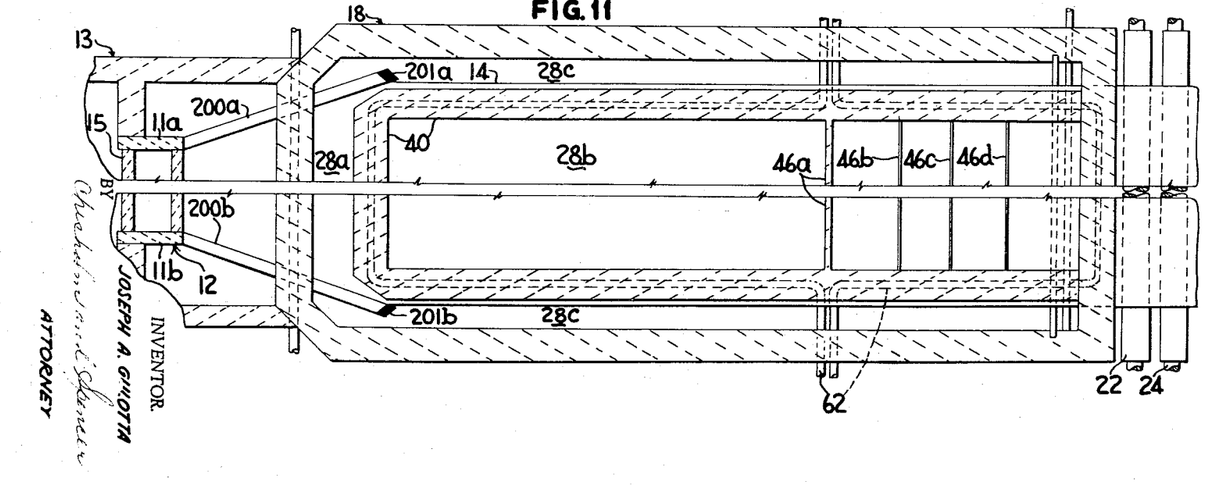
FIG. 11 is a horizontal sectional view taken on line 11—11 of FIG. 10 looking in the direction of the arrows.

There is shown in FIGS. 10 and 11 a further embodiment of apparatus for producing glass according to the inventive process herein contemplated. This embodiment is similar to that shown in FIGS. 1 and 2 but includes modified diverging walls extending from the forming spout. Because in many respects the embodiment of FIGS. 10 and 11 is identical with the embodiment of FIGS. 1 and 2, like parts have been indicated by the same reference numerals. Thus, in a manner similar to that explained in connection with FIGS. 1 and 2, glass issuing from a spout 12 of a furnace 13 forms a layer of molten glass 14 upon the surface of a bath of molten metal 16 contained within a tank 18. A regulator tweel 15 and a gate 17 control the flow of glass. Tank 18 is constructed in the same manner as explained earlier in connection with FIGS. 1 and 2, including the top portion 28 thereof, which is divided into two pressure chambers 28a and 28b by circumferential wall 40.

Diverging refractory side walls 200a and 200b are located just beneath spout 12 and extend along, in contact with, and above the surface of the metal bath 16. Preferably they also extend below the surface of the metal bath. The walls are suitably supported, as explained in connection with walls 19a and 19b. Side walls 200a and 200b are constructed of conventional refractory material, such as fired clay block, and diverge in the direction of glass travel from a width approximately equal to the width of spout 12 to a width corresponding to the desired ribbon width. At the downstream terminal end of each side wall 200a and 200b is a refractory insert 201a and 201b, respectively, of a material nonwettable by molten glass. The refractory side walls 200a and 200b extend in the direction of glass travel for a distance that positions the terminal ends thereof at a location that will release the ribbon from contact therewith only after the central portion of the ribbon is beneath pressure chamber 28b. With this arrangement the molten layer of glass passes from chamber 28a through the seal 54 beneath circumferential wall 40 and into the chamber 28b while still in contact with diverging side walls 200a and 200b. Control of the thickness and width of the ribbon is thereby maintained by side walls 200a and 200b until thickness control is provided by the pressure of chamber 28b. Continuous and accurate control of ribbon thickness is provided without interruption and without relying upon the pressure of seal 54 to control thickness of that portion of the layer passing beneath the front portion of circumferential wall 40.

Figure 12:
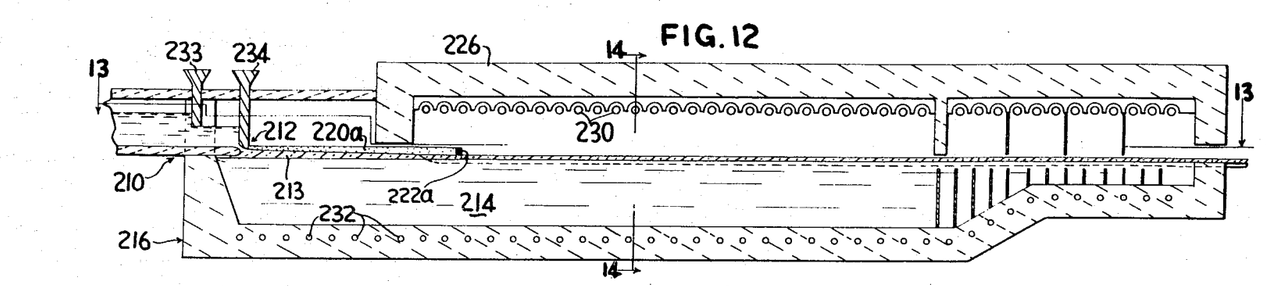
FIG. 12 is a longitudinal sectional view of another embodiment of apparatus for producing glass according to the inventive process herein contemplated showing means for depositing a layer of glass upon a molten bath and controlling its width, thickness and position upon the bath and showing a bi-level bath for controlling the thickness of the glass.
Figure 13:
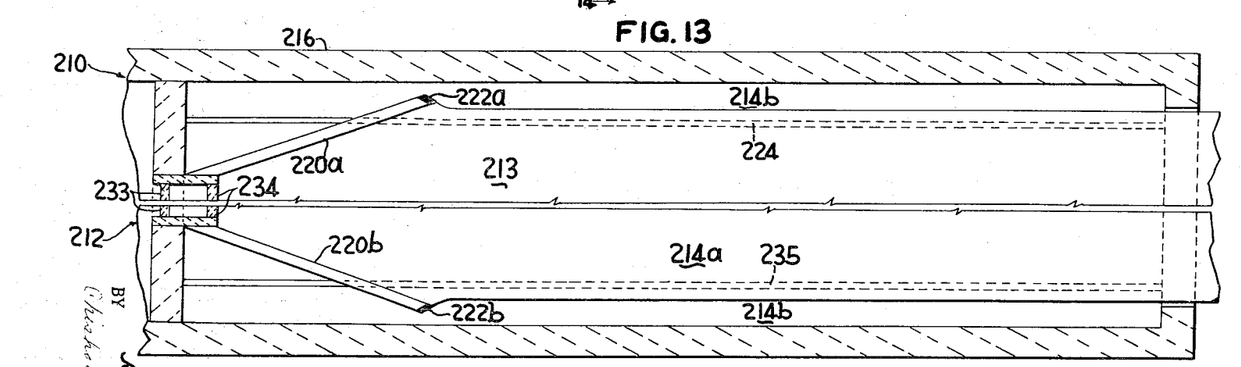
FIG. 13 is a horizontal sectional view taken along the line 13—13 of FIG. 12 and in the direction of the arrows.
Figure 14:
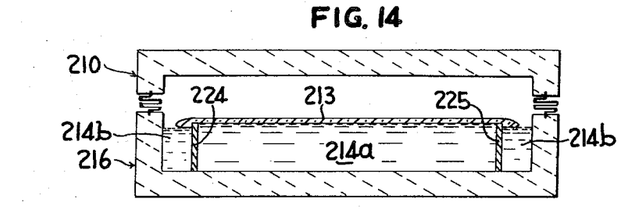
FIG. 14 is a transverse sectional view of reduced scale taken along the line 14—14 of FIG. 12 and in the direction of the arrows.

With reference to FIGS. 12-14, there is shown a further embodiment of apparatus for producing glass according to the inventive process herein contemplated. In this embodiment a molten layer of glass is spread to a controlled width and thickness by refractory walls, preferably wettable by molten glass, and the glass thickness is thereafter modified by supporting the layer of glass upon a bi-level molten metal bath.

Molten glass is issued from a conventional melting tank 210 through a spout 212 of the same construction as previously described in connection with the spout 12 of the embodiment of FIGS. 1 and 2. The molten glass is issued to form a layer 213 directly upon a molten metal bath 214 contained within a tank 216. Diverging refractory walls 220a and 220b are located just beneath spout 212 and extend from the spout 212 both above and below the surface of the molten metal bath 214. At the downstream terminal end of each diverging refractory side wall 220a and 220b is a refractory insert 222a and 222b, respectively, of a material such as graphite that is nonwettable by molten glass and that facilitates freeing the molten layer of floating glass from contact with the side walls 220a and 220b.

Tank 216 is longitudinally divided into a central bath 214a and marginal baths 214b on each side thereof by two, spaced, longitudinally extending, upstanding walls 224 and 225 in tank 216. The upper edges of walls 224 and 225 contact portions of the glass and thus are preferably constructed of a material that is not wet thereby, as for example, graphite. The level of the metal in each bath is controlled by suitable means (not shown), and in this illustrative embodiment the level of central bath 214a is even with the upper edges of walls 224 and 225 and is above the level of metal in each of the marginal baths 214b. The level of molten metal is the same in both marginal baths 214b. Side walls 220a and 220b intersect upstanding walls 224 and 225, respectively, intermediate the ends of walls 224 and 225, and extend there beyond a short distance into marginal baths 214b.

The layer of glass 213 is delivered directly to the central baths 214a from spout 212. The glass is at a melting temperature and readily flowable. The temperature of the glass is maintained in a flowable state by radiant roof heaters 230, and the temperature of the molten bath is maintained at a proper elevated temperature by electrodes 232 imbedded in the base of tank 216. The flow of molten glass from melting tank 210 is controlled by a glass flow regulating tweel 233 and a gate 234.

The molten glass flows upon central bath 214a and spreads laterally into wetting contact with diverging refractory side walls 220a and 220b as the layer advances along the metal bath. The thickness of the molten layer of glass is controlled by the rate of glass feed and withdrawal and the angle at which side walls 220a and 220b diverge, in the manner previously described. At the point where the diverging side walls cross walls 224 and 225 dividing bath 214 into three compartments, the marginal portions of the molten layer of glass become supported at the lower level provided by marginal baths 214b. Slightly beyond this location in the downstream direction the molten layer is released from contact with the diverging side walls 220a and 220b.

The upper or top surface of the molten layer of glass will remain substantially flat as the ribbon travels down the length of bath 214. The ribbon is first maintained at an elevated temperature to assure that adequate flatness has been achieved and surface defects have been eliminated through viscous flow of the glass. The ribbon is thereafter cooled and removed from the molten bath.

Where the rates of glass introduction and withdrawal and the angle at which the side walls 220a and 220b diverge are correlated to produce a layer of molten glass at a thickness substantially equal to the equilibrium thickness of the glass at the terminal ends of diverging side walls 220a and 220b, the molten layer of glass may thereafter be modified in thickness by the bi-level bath 214. For example, where the central bath 214a is higher than marginal baths 214b, the molten layer of equilibrium thickness glass will, through viscous flow, assume a flat upper surface. Then central portion supported by central bath 214a will become thinner than the marginal portions supported by marginal baths 214b. The marginal portions of the glass layer will increase in width while remaining at the equilibrium thickness.

It will be understood that the flow of glass may be controlled so that the molten layer is at a thickness greater than equilibrium at the terminal ends of diverging side walls 220a and 220b, the walls serving to control this thickness and location of the layer. The greater than equilibrium thickness of the molten layer of glass may be maintained by providing a bi-level molten metal bath in which the central portion 214a is at a lower level than marginal baths 214b.

VARIATIONS

In connection with above-described embodiments, it should be understood that, in lieu of molten tin or tin alloy, other stable molten materials having a greater density than the glass of the ribbon may be used in the practice of this invention, including: lead, lead-zinc alloys, lithium or the like and metal salts such as copper chloride, lead chloride, and like materials which have a density above about 2.5 and are stable, essentially nonvolatile, liquids at the melting temperature of the glass treated.

While the use of an intermediate gas partition is an effective seal, it will be understood that other means may be resorted to. For example, the lower ends of walls 40 may be disposed so close to the top of the ribbon that substantial leakage does not occur and the desired pressure differential can be maintained.

The width of the ribbon with respect to the pressure chamber may be varied. For example, where thicker sheets are desired the ribbon need not extend beyond the outer edges of the walls 40 since the gap supplied from pipes 62 provides the differential pressure required. In this case the gas supplied in this way can generate a super-atmospheric pressure profile at the edges of the ribbon and the chamber 28b can be held at atmospheric pressure.

It will be understood that the use of side walls wettable by molten glass in conjunction with a flow of glass upon a metal bath will facilitate attainment of a given thickness of such a molten glass layer in a shorter distance of travel for a given quantity of glass than either a freely floating layer of glass (i.e., with the marginal edges unconfined). It will also be understood that this invention may advantageously be used to achieve a ribbon having a thickness less than the equilibrium thickness of glass freely floating on a metal bath. In addition to the above, the present invention contemplates the use of marginal contacting, confining, refractory walls of a material non-wettable by molten glass for the purpose of confining the marginal edges of a molten glass layer to maintain a ribbon thickness in excess of the equilibrium thickness and thereafter to maintain such thickness, as by using a pressure chamber arrangement as disclosed in FIGS. 1 through 5. It is also contemplated to use such nonwettable side walls in conjunction with a spout for depositing molten glass directly upon a metal bath for the purpose of accurately controlling the location of the ribbon or molten layer at the point where it achieves equilibrium thickness.

It should be understood that the diverging walls, such as walls 19a and 19b, 200a and 200b and 220a and 220b, that control the width, thickness and location of the layer of glass need not be constructed in the precise manner disclosed herein to function in accordance with the inventive concept. For example, it is contemplated that the diverging walls extending from the spout of the glass melting tank may be integral with the tank and may even replace, i.e., form, part of the walls of the tank containing the molten metal.

While the foregoing embodiments of this invention have been described primarily in connection with the establishment of a subsequent pressure differential or bi-level bath for maintaining a thickness and width obtained by the flowable layer or ribbon of glass at the release point of the wetted refractory walls, it is also possible to attain dimensional stability through suitable temperature control. Thus in lieu of a pressure chamber or bi-level bath immediately following the diverging side walls that control width, thickness and location of the glass layer, the temperature of the glass at the release point may be lowered to a point (normally to a temperature above 1400 degrees Fahrenheit and preferably between about 1500 degrees Fahrenheit to 1600 degrees Fahrenheit) where the viscosity of the glass is high enough to prevent substantial changes in ribbon dimensions in the time available and from the forces present, and yet is sufficiently low to permit the release of the ribbon from the walls.

Although the present invention has been described with reference to certain specific details, it is not intended that such details be regarded as limitations upon the scope of the invention, except insofar as is included in the accompanying claims.

I claim:
1. In a method of forming a glass ribbon in which a continuous layer of molten glass is issued upon an elongated liquid bath which is heavier than glass, the layer advanced along the bath to form a ribbon of glass and the resulting ribbon removed from the bath, the improvement which comprises,
  (a) providing a diverging zone on the surface of said liquid bath, said zone being defined by a pair of stationary diverging walls each extending from a location of convergence on said liquid bath to a terminal location spaced from the edge of said liquid bath adjacent thereto;
  (b) flowing molten glass onto the surface of said liquid bath in said diverging zone at a controlled rate while the glass is essentially in a flowable state adjacent said location of convergence until said molten glass reaches each of said stationary walls, and along the surface of said liquid bath in the direction of divergence of said zone until said molten glass reaches said terminal locations of said stationary walls and forms thereat a ribbon of molten glass having free side edges spaced from the edges of said liquid bath and a selected width and thickness;
  (c) moving said ribbon of molten glass along said liquid bath beyond said diverging zone;
  (d) thereafter applying forces to said ribbon of molten glass sufficient to maintain said ribbon at said selected width and thickness as it advances along said liquid bath;
  (e) cooling said ribbon until it solidifies; and
  (f) removing said cooled, solidified ribbon of glass of a selected width and thickness from said bath.
2. The method of claim 1 which comprises,
  (a) flowing said molten glass onto the surface of said liquid bath and along said liquid bath in the direction of divergence of said zone, at a rate sufficient to provide a ribbon at the terminal points of said stationary walls of a thickness at least equal to the equilibrium thickness of said molten glass on said liquid bath.

3. The method of claim 2 which comprises,
applying forces to the surfaces of said ribbon of molten glass after moving beyond said diverging zone sufficient to decrease the thickness of said ribbon to less than said equilibrium thickness.

4. An apparatus for forming a glass sheet comprising,
(a) a chamber containing an elongated molten bath immiscible with and heavier than molten glass, said chamber having side walls to provide said molten bath with side edges;
(b) a pair of stationary diverging walls positioned in said molten bath and extending above the surface thereof a distance at least as great as the thickness of said glass sheet, said diverging walls each extending from a location of convergence in said molten bath to a terminal location spaced from an adjacent side edge of said molten bath;
(c) means for feeding molten glass onto the surface of said molten bath between and into contact with said diverging walls at a location adjacent said location of convergence of said diverging walls and for moving said glass along said molten bath in the direction of divergence of said diverging walls; and
(d) a member mounted on the wall of each of said diverging walls in contact with the molten glass therebetween and at the end thereof, each member being of a material which glass does not wet.

5. The apparatus of claim 4, wherein each of said members is carbon.

References Cited

UNITED STATES PATENTS

| | | | |
|---|---|---|---|
| 2,276,615 | 3/1942 | Hazelett | 65—91 |
| 3,186,813 | 6/1965 | Pfaender | 65—90 |
| 3,264,081 | 8/1966 | Pilkington | 65—99 |
| 3,266,880 | 8/1966 | Pilkington | 65—182 |
| 3,317,302 | 5/1967 | Misson | 65—99 |

DONALL H. SYLVESTER, *Primary Examiner.*

R. V. FISHER, *Assistant Examiner.*

U.S. Cl. X.R.

65—182